United States Patent
Ying et al.

(10) Patent No.: US 8,249,171 B2
(45) Date of Patent: Aug. 21, 2012

(54) MPEG-2 TRANSPORT STREAM PACKET SYNCHRONIZER

(75) Inventors: Feng Ying, Plano, TX (US); Towfique Haider, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1685 days.

(21) Appl. No.: 11/558,519

(22) Filed: Nov. 10, 2006

(65) Prior Publication Data

US 2008/0112438 A1 May 15, 2008

(51) Int. Cl.
*H04N 7/12* (2006.01)
(52) U.S. Cl. .................................. 375/240.28; 370/507
(58) Field of Classification Search ............. 375/240.28; 370/507
See application file for complete search history.

(56) References Cited

U.S. PATENT DOCUMENTS

| | | | | |
|---|---|---|---|---|
| 4,586,189 A | * | 4/1986 | Tyrrell | 375/370 |
| 5,585,864 A | * | 12/1996 | Takeuchi | 348/719 |
| 5,590,413 A | * | 12/1996 | Kondratiev et al. | 455/86 |
| 5,797,033 A | * | 8/1998 | Ecclesine | 710/22 |
| 6,329,850 B1 | * | 12/2001 | Mair et al. | 327/107 |
| 2001/0004366 A1 | * | 6/2001 | Matsumura et al. | 370/509 |
| 2006/0198479 A1 | * | 9/2006 | Hsu et al. | 375/354 |
| 2006/0206777 A1 | * | 9/2006 | Shen | 714/755 |
| 2007/0036022 A1 | * | 2/2007 | Song | |

* cited by examiner

*Primary Examiner* — Mehrdad Dastouri
*Assistant Examiner* — Mohammed Rahaman
(74) *Attorney, Agent, or Firm* — John J. Patti; Wade J. Brady, III; Frederick J. Telecky, Jr.

(57) ABSTRACT

A data synchronizer that receives an input stream of asynchronous digital data in packets, and provides an output stream of synchronous data in packets. The synchronizer includes a first memory unit and a second memory unit, each having a data input, a data output, a write clock input and a read clock input. A first switch is provided for switching connection of the input in alternating manner between the first memory unit input and the second memory unit input, and a second switch is provided for switching connection of the data synchronizer output in alternating manner between the first memory unit output and the second memory unit output. A write clock is provided to write clock inputs of the first and second memory units. The average data rate of the received valid data during the reception of the packet is determined, and a read clock is generated and provided to the first and second memory units at a rate corresponding to the average data rate of the received valid data bits during the reception of the packet being read. The switching of the first and second switches is controlled such that the switches switch between adjacent packets, with the second switch switching in opposite phase to that of the first switch.

15 Claims, 2 Drawing Sheets

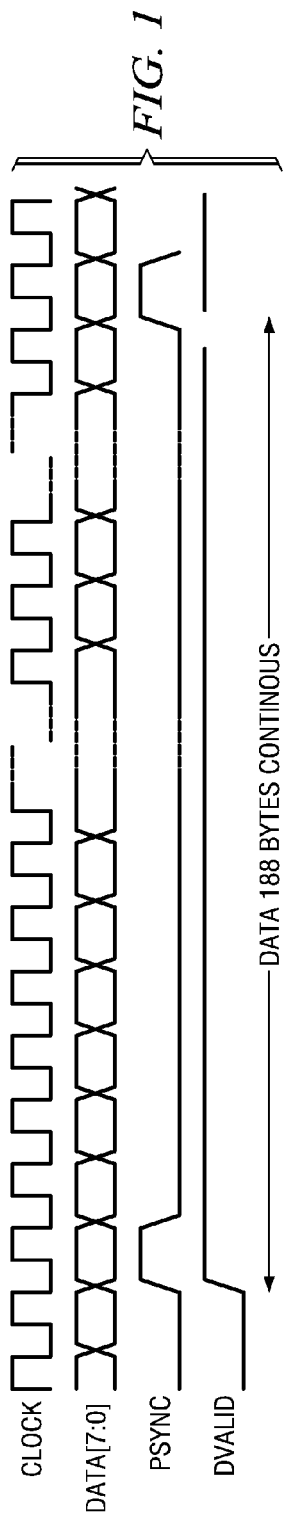
FIG. 1
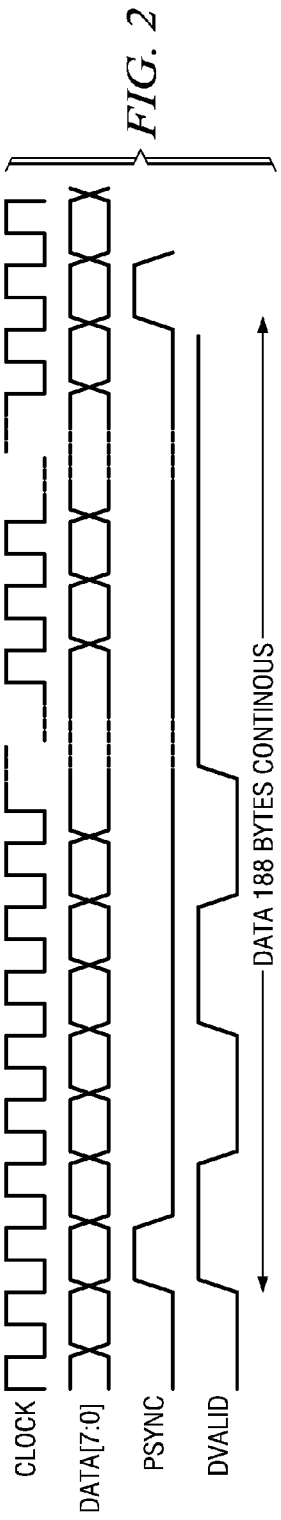
FIG. 2
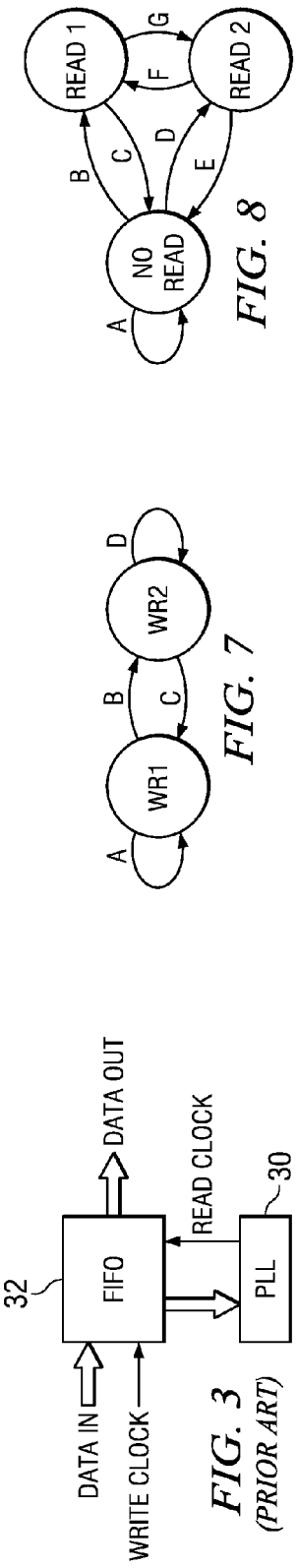
FIG. 8
FIG. 7
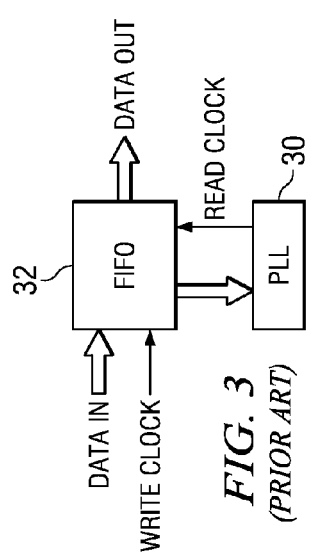
FIG. 3
(PRIOR ART)

MPEG-2 TRANSPORT STREAM PACKET SYNCHRONIZER

TECHNICAL FIELD OF THE INVENTION

The present invention relates to the synchronization of transmitted data, and more particularly relates to the synchronization of MPEG-2 data.

BACKGROUND OF THE INVENTION

A widely used coding and compression standard for audio and video is the MPEG-2 standard. MPEG-2 is actually the designation for a group of such standards, promulgated by the Moving Picture Experts Group ("MPEG") as the ISO/IEC 13818 international standard. A typical use of MPEG-2 is to encode audio and video for broadcast signals, including signals transmitted by satellite and cable.

An MPEG-2 transport stream ("MPEG-2 TS") is data in a format specified in Part 1, Systems, of ISO/IEC 13818-1. The purpose of the format is to allow the multiplexing of digital video and audio data, and the synchronizing of the resulting output. The basic unit of data in an MPEG-2 TS is the packet. Packets are usually 188 bytes long, but can be 204 bytes long.

An MPEG-2 TS may be transmitted in Packet Synchronous mode or Packet Asynchronous mode. In Packet Synchronous mode, the clock rate is same as the MPEG-2 data rate, as shown in FIG. 1, which is a graph showing signal level versus time for four signals found in a Packet Synchronous mode system. The four signals are a data valid ("DVALID") signal, a packet synchronization ("PSYNC") signal, a data signal and a clock signal. The respective signals are vertically displaced, but horizontally (time) aligned to show relative timings of the signals. As can be seen, because the clock and data are synchronous, with the beginning of the clock cycle (in this case, the rising edge of the clock) being made to coincide with approximately the middle of a data bit, at the beginning of each clock cycle there is valid MPEG-2 data. For this reason, DVALID is simply maintained high during the entire packet, after the occurrence of a PSYNCH signal that signals the beginning of the packet, as shown in the figure.

In contrast, in Packet Asynchronous mode, the clock rate is fixed at some frequency that is higher than MPEG-2 data rate, as shown in FIG. 2, which is a graph similar to that of FIG. 1, but showing signals found in a Packet Asynchronous mode system. At each clock period, the data may or may not be valid, so each valid bit of data needs to be accompanied by a DVALID signal to inform the system that valid data does, in fact, exist at the beginning of the associated clock cycle. Otherwise, DVALID is not asserted, to inform the system that valid data does not exist at the beginning of a clock cycle.

Some MPEG-2 TS receiving equipment may be limited to receiving only Packet Synchronous data. Therefore, before providing a Packet Asynchronous data stream to such equipment, the data stream needs to be converted into a Packet Synchronous data stream. This procedure is called Packet Synchronization or sometimes Packet Smoothing.

In general, to achieve data synchronization, a first-in-first-out ("FIFO") buffer memory is typically used, since incoming data and outgoing data may have different clocks. The output clock frequency needs to be matched with the average data rate. This matching is normally achieved by using a dedicated PLL 30 which monitors either data rate or the fill status of a FIFO 32, as shown in FIG. 3. Now, it is known that the locking time of a PLL is dominated by its loop filter bandwidth which is designed to be slow to minimize the noise contribution of the phase detector and maintain the PLL stability. However, as a result, it takes many clock cycles to respond to an input data rate shift. To guarantee that no data is lost when a data rate shift does happen, the FIFO length, i.e., the memory size of the FIFO, needs to be much larger than the packet size.

However, the larger a FIFO that must be provided, the more expensive the circuit incorporating it. Therefore, it would be desirable to have a way of providing for MPEG-2 TS Packet Synchronization with a minimal FIFO size.

SUMMARY OF THE INVENTION

The following summary presents a simplified description of the invention, and is intended to give a basic understanding of one or more aspects of the invention. It does not provide an extensive overview of the invention, nor, on the other hand, is it intended to identify or highlight key or essential elements of the invention, nor to define the scope of the invention. Rather, it is presented as a prelude to the Detailed Description, which is set forth below, wherein a more extensive overview of the invention is presented. The scope of the invention is defined in the Claims, which follow the Detailed Description, and this section in no way alters or affects that scope.

The present invention provides a data synchronizer that receives an input stream of asynchronous digital data in packets, and provides an output stream of synchronous data in packets. The synchronizer includes a first memory unit and a second memory unit, each having a data input, a data output, a write clock input and a read clock input. A first switch is provided for switching connection of the input in alternating manner between the first memory unit input and the second memory unit input, and a second switch is provided for switching connection of the data synchronizer output in alternating manner between the first memory unit output and the second memory unit output. A write clock is provided to write clock inputs of the first and second memory units. The average data rate of the received valid data during the reception of the packet is determined, and a read clock is generated and provided to the first and second memory units at a rate corresponding to the average data rate of the received valid data bits during the reception of the packet being read. The switching of the first and second switches is controlled such that the switches switch between adjacent packets, with the second switch switching in opposite phase to that of the first switch.

These and other aspects and features of the invention will be apparent to those skilled in the art from the following detailed description of the invention, taken together with the accompanying drawings.

BRIEF DESCRIPTION OF THE DRAWINGS

FIG. 1 is a signal timing diagram for representative signals found in a synchronous MPEG-2 packet system.

FIG. 2 is a a signal timing diagram for representative signals found in an asynchronous MPEG-2 packet system.

FIG. 3 is a high level diagram of a prior art packet data synchronizer.

FIG. 7 is a state diagram showing the conditions for writing data using the data packet synthesizer of FIG. 4.

FIG. 8 is a state diagram showing the conditions for reading data using the data packet synthesizer of FIG. 4.

DETAILED DESCRIPTION OF THE PREFERRED EMBODIMENT

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 4:
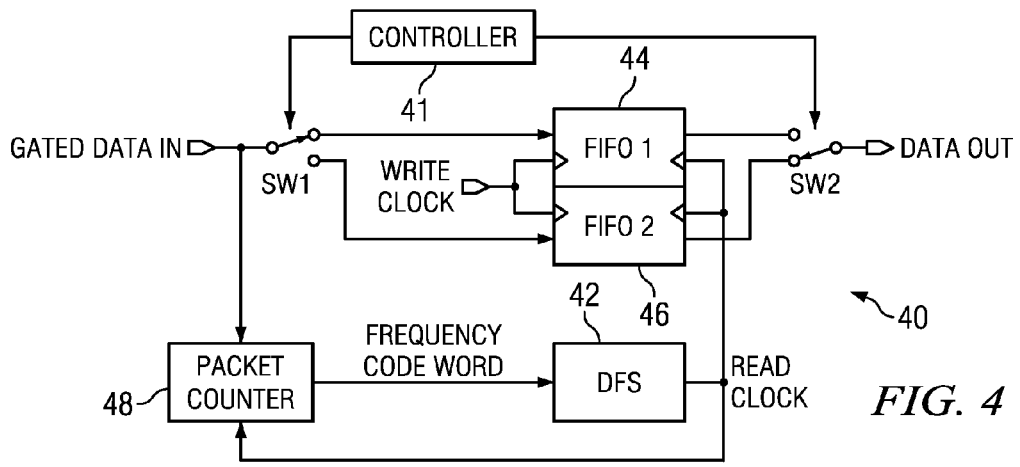
FIG. 4 is a high level diagram of a data packet synchronizer according to a preferred embodiment of the invention.

A preferred embodiment of a Packet Synthesizer 40 according to the present invention is shown in FIG. 4. This embodiment utilizes a digital phase locked loop ("DPLL") that is modified to function as a digital frequency synthesizer ("DFS") 42, and that has essentially instantaneous response time so the FIFO length may be reduced to that of only two packets. "Essentially instantaneous" in this context means that the frequency is updated within one clock cycle after the update command is sent. The write clock is the supplied clock from input gated by the valid signal.

Referring now to FIG. 4, the Packet Synchronizer 40 is an electronic circuit, preferably implemented in CMOS, that has a Gated Data In input, a Write Clock input, and a Data Out output. Two FIFO buffers, FIFO 1 44 and FIFO 2 46, each with one MPEG-2 packet length, are shown. Also shown is a Packet Counter 48 having its input connected to Data In and its output connected to the input of the DFS 42. The output of the DFS is used as a Read Clock. The Write Clock input is provided to the write clock inputs of both FIFO buffers 44 and 46, while the Read Clock from the DFS 42 is provided to the read clock inputs of both FIFO buffers 44 and 46. A first switch SW1 alternates connection of the Gated Data In input between FIFO 1 44 and FIFO 2 46. A second switch SW2 alternates connection of the Data Out output between FIFO 1 44 and FIFO 2 46, in opposite phase to the connections of the first switch SW1. Both switches SW1 and SW2 are controlled by controller 41. Thus, while one FIFO buffer is writing the data from Gated Data In, the other FIFO is reading out the data continuously to Data Out.

The Packet Counter 48 counts the number of write clock cycles and the number of valid data bits during a valid MPEG-2 packet and calculates the correct frequency for the read clock. For example, assuming a packet length of 188 bytes, after the number of bits in 188 valid bytes are counted by the Packet Counter 48 (1 byte=8 bits; thus 188 bytes=8·188=1,504 bits), it determines the number N of input clock cycles counted in the duration of the packet, and sets the read frequency, fr, at 188·fc/N, where fc is the input clock frequency.

As is explained in detail below in conjunction with FIG. 5, the system clock PLL shares the same analog phase locked loop ("APLL") with the read clock. Therefore, since the write clock frequency is typically same as or related to the system clock, accurate calculation of the read clock frequency is possible. The Packet Counter 48 calculates a frequency code word corresponding to the calculated read clock frequency fr. The resulting frequency code word is then used to update the DFS 42 frequency at the very beginning of reading the next buffer. Because the DFS 42 response is substantially instantaneous, the reading clock frequency matches the writing data rate of the previous packet. No extra buffer length is required.

Figure 5:
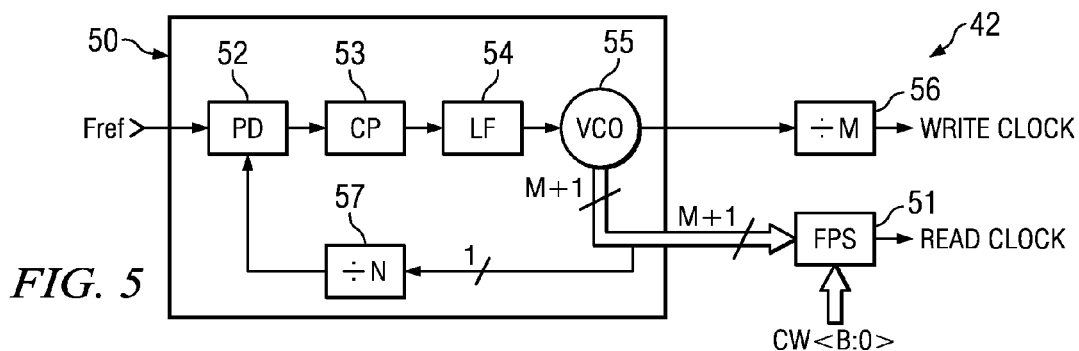
FIG. 5 is a diagram of the digital frequency synthesizer 42 of FIG. 4.

FIG. 5 is a simplified diagram of an exemplary DFS 42 implementation. The DFS 42 includes an analog PLL 50 and a digital frequency and phase synthesizer ("FPS") 51. The DFS 42 is similar to one described in detail in U.S. Pat. No. 6,329,850, which issued on Dec. 11, 2001 to Hugh Mair, et al., which is commonly assigned and is incorporated herein by reference. The APLL 50 includes a phase detector 52 receiving at one input a reference frequency Fref. The other input receives a feedback signal, described below. The output of the phase detector 52 is provided to the input of a charge pump 53, the output of which is provided to a low pass filter 54, the output of which is provided to the control input of a voltage controlled oscillator ("VCO") 55, and controls the frequency of a clock generated therein.

The output of VCO 55 is an M+1 bus PH<0:M>, each line of which provides one of M+1 uniformly delayed phases of the VCO 55 clock. All lines of bus PH<0:M> are provided to one input of the frequency and phase synthesizer FPS 51, while the phase 0 line PH0 only is provided as an output of the APLL 50, after being divided by M in a frequency divider 56. The FPS 51 also receives the frequency code word on a B+1 wide bus CW<B:0>. The FPS 51 provides an output read clock signal at a frequency determined by the value of CW<B:0>. The phase 0 line PH0 only is also provided to a divide by N divider 57, the output of which is provided as the feedback signal, mentioned above, to phase detector 52. APLL 50 operates according to well known principles.

The specific digital value of the frequency code word on bus CW<B:0> corresponds to a multiple of the frequency of the clock signal generated by APLL 50. Thus, the calculation of the frequency code word in Packet Counter 48 (FIG. 4) is calculated to be equal to fr·P, where P is a factor relating the read clock frequency to the APLL 50 frequency. As explained in detail in the '850 patent, the value of B is greater than $\log_2 M$, and is selected by the designer to be greater than the number required to uniquely select individual phase signals on bus PH<0:M> by an amount providing desired additional precision in selection of the time-averaged frequency of the output clock signal from APLL 50, thereby ensuring that only two packet length FIFOs are needed in the hardware implementation.

Figure 6:
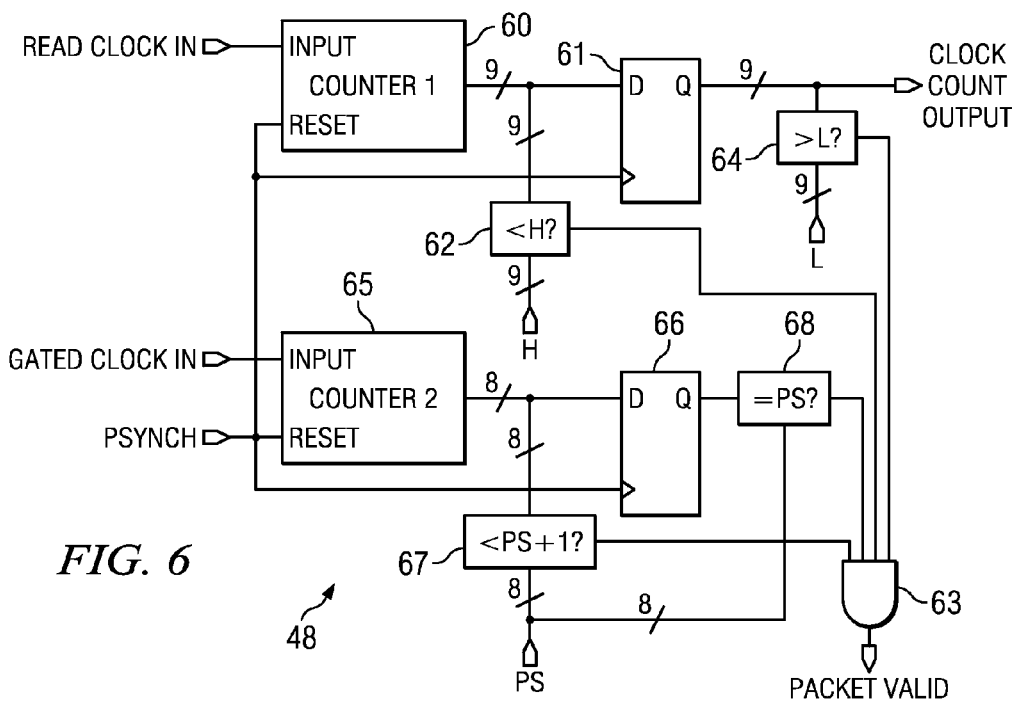
FIG. 6 is a diagram of the packet counter of FIG. 5.

FIG. 6 is a simplified diagram of an exemplary Packet Counter 48 (FIG. 4) implementation. The read clock, fr, is provided to the input of a first counter, counter 1 60, that has a nine bit wide count output. The PSYNCH signal is provided to the reset input of counter 1 60. The counter 1 60 output is provided to the D input of a 9-bit wide flip-flop 61 (nine flip-flops in parallel, each receiving one bit line of the counter 1 60 output) and to one input of a first comparator 62. The other input of comparator 62 is a higher limit value, H, also nine bits. Comparator 62 provides a 1 output when the count output of counter 1 60 is less than H, but a 0 output otherwise. The output of comparator 62 is provided to a first input of a 4-input AND gate 63, the output of which is a Packet Valid signal. The 9-bit wide Q output of flip-flop 61 is the clock count output, being the number of clock cycles counted in a packet. The PSYNCH signal, provided at the beginning of every packet, is provided to the clock input of flip-flop 61. The 9-bit wide Q output of flip-flop 61 is also provided to one input of a second comparator 64. The other input of comparator 64 is a lower limit value, L, also nine bits. Comparator 64 provides a 1 output when the clock count output is greater than L, but a 0 otherwise. The output of comparator 64 is provided to the second input of 4-input AND gate 63.

The gated input clock is provided to the input of a second counter, counter 2 65, that has an eight bit wide count output. The PSYNCH signal is provided to the reset input of counter 2 65. The counter 2 65 output is provided to the D input of an 8-bit wide flip-flop 66 (eight flip-flops in parallel, each receiving one bit line of the counter 2 65 output) and to one input of a third comparator 67. The other input of comparator 67 is a packet size value, PS, also eight bits. Comparator 67 provides a 1 output when the count output of counter 2 65 is less than PS+1, but a 0 output otherwise. The output of comparator 65 is provided to the third input of 4-input AND gate 63. The 8-bit wide Q output of flip-flop 66 is the packet count output, being the number of valid data bits counted in a packet. The PSYNCH signal is provided to the clock input of flip-flop 66. The 8-bit wide Q output of flip-flop 66 is also provided to one input of a fourth comparator 68. The other input of comparator 68 is the value PS. Comparator 68 provides a 1 output when the packet count output is equal to PS, but a 0 otherwise. The output of comparator 68 is provided to the fourth input of 4-input AND gate 63.

In operation, counter 1 60 of the Packet Counter 48 begins counting read clock cycles immediately after the PSYNCH signal is asserted, and provides the current count value, in bytes, as it is counting as a 9-bit output. Comparator 62 monitors this output, and so long as it remains below the higher limit value, H, asserts a 1 to its input to AND gate 63. When the next PSYNCH signal is asserted, signaling the end of the current packet and the beginning of the next packet, flip-flop 61 provides the count value, again, in bytes, at its D input, being the final count of clock cycles in the packet, at its Q output. This is the clock count output, and it can be seen that it is a value that is updated once every packet. Comparator 64 monitors the clock count output, and once it goes above the lower limit value, L, asserts a 1 to its input to AND gate 63. The value L is provided by the designer or user, and is determined in accordance with system requirements and/or limitations.

Counter 2 65 begins counting gated data bits immediately after the PSYNCH signal is asserted, and provides the current count value, in bytes, as it is counting as a 8-bit output. Comparator 67 monitors this output, and so long as it remains below or equal to the packet size value, PS, asserts a 1 to its input to AND gate 63. For example, in MPEG-2 systems the value of PS will usually be 188. When the next PSYNCH signal is asserted, signaling the end of the current packet and the beginning of the next packet, flip-flop 66 provides the count value, again, in bytes, at its D input, being the final count of valid data bits in the packet, at its Q output. This is updated once every packet. Comparator 68 monitors the valid data byte count output, and if it is equal to PS, asserts a 1 to its input to AND gate 63. In this way, comparator 67 continuously monitors the valid bit count, and if it ever exceeds the architected size of a packet, immediately asserts a 0, thereby blocking the assertion of the packet valid signal, thus signaling that an error has occurred in the receipt of the current packet. Likewise, comparator 68 monitors the final count of valid data bytes, and if this count is anything other than the architected size of a packet, asserts a 0, thereby blocking the assertion of the packet valid signal, thus signaling that an error has occurred in the receipt of the current packet. It will be appreciated that for final counts of greater than PS, this action by comparator 68 will be redundant to that of comparator 67, so that its essential function is to supplement the function of comparator 67 to block the packet valid signal when the final packet count is less than the architected value.

The specific timing of the controls for the operation of the Packet Synchronizer 40 of FIG. 4 will now be described, with reference to FIGS. 7 and 8. FIG. 7 is a state diagram showing the conditions for a write operation to FIFOs 44 and 46 (FIG. 4), i.e., the conditions defining the control of switch SW1 (FIG. 4). In the figure, the following Write Rules apply to the paths in the state diagram:

a: if not (packet valid 1)
b: if (packet valid 1) and PSYNCH occurs
c: if not (packet valid 2)
d: if (packet valid 2) and PSYNCH occurs.

In this terminology, packet valid 1 means that the packet valid signal (FIG. 6) is being asserted during a packet that is to be written to FIFO 1 44. Likewise, packet valid 2 means that the packet valid signal is being asserted during a packet that is to be written to FIFO 2 46. Reset byte counter occurs when the PSYNCH signal is asserted during the start of the next new packet. With this understood, it can be seen that Write Rule a, above, means keep on writing to FIFO 1. Write Rule b means complete writing to FIFO 1 and Jump to FIFO 2 for the next packet writing. Write Rule c means keep on writing to FIFO 2. Write Rule d means complete writing to FIFO 2 and Jump to FIFO 1. Thus, the Packet Synthesizer 40 alternates, packet by packet, between writing to FIFO 1 44 and to FIFO 2 46, with alternations being signaled by the PSYNCH signal, so long as the packet valid signal is asserted.

FIG. 8 is a state diagram showing the conditions for a read operation from FIFOs 44 and 46 (FIG. 4), i.e., the conditions defining the control of switch SW2 (FIG. 4). In the figure, the following Read Rules apply to the paths in the state diagram:

a: if (not (packet valid 1) and not (packet valid 2))
b: if packet valid 1
c: if read packet 1 complete and not (packet valid 2))
d: if packet valid 2
e: if (read packet 2 complete and not (packet valid 1)) or reset
f: if packet valid 1
g: if packet valid 2.

In this terminology, read packet 1 complete means that the reading of a packet from FIFO 1 44 is complete, while read packet 2 complete means that the reading of a packet from FIFO 1 44 is complete, which are determined from the state of the write packet valid 1 and write packet valid 2 signals, respectively. This is signaled by monitoring a count of the read clock, and signaling complete when a number equal to the packet size (usually 188 bytes in MPEG-2) occurs. With this understood, it can be seen that Read Rule a, above, means that there is no valid data to be read, therefore wait. Read Rule b means start reading packet 1, since that packet has been completely written. Read Rule c means that there is no data to be read, therefore wait. Read Rule d means start reading packet 2, since that packet has been completely written. Read Rule e means that there is no valid data to be read, therefore wait. Read Rules f and g show the "ping pong" alternating reading between FIFO 1 and FIFO 2 when data is coming in and going out in a continuously synchronous fashion. In this condition, the Packet Synthesizer 40 alternates, packet by packet, between reading from FIFO 1 44 and to FIFO 2 46, in opposite phase with the writing to those FIFOs, with alternations being signaled by the PSYNCH signal, so long as the packet valid signal is asserted for the packet in that FIFO.

Thus, the present invention provides a synchronizer for MPEG-2 TS that uses a substantially instantaneous response PLL. It requires only two packet length buffers, and no dedicated analog PLL is necessary.

Although the present invention and its advantages have been described in detail, it should be understood that various changes, substitutions and alterations can be made herein without departing from the spirit and scope of the invention as defined by the appended claims. For example, it will be appreciated that, while the memory units employed in the preferred embodiment disclosed herein are FIFOs, because of the precision available in applying the principles of the present invention, other types of memories may be employed in embodiments of the invention, as well.

What is claimed is:

1. A data synchronizer having an input that receives an input stream of asynchronous digital data in packets and an output that receives an output stream of synchronous data in packets, wherein each packet having a length and valid data bits asserted during valid periods, the data synchronizer comprising:

a first memory unit and a second memory unit, wherein the first and second memory units each have a data input, a data output, a write clock input- and a read clock input, and wherein each of the first and second memory units receive a write clock signal at its write clock input;

a first switch that switches the input of the data synchronizer in alternating manner between the data inputs of the first and second memory units;

a second switch that switches the output of the data synchronizer in alternating manner between the data outputs of the first and second memory units;

a packet counter having an input that is coupled to the input of data synchronizer, wherein the packet counter counts a number of write clock cycles in a received packet and provides an output frequency code word representing an average data rate of the received valid data during the reception of the received packet;

a digital frequency synthesizer having an input that receives the frequency code word and that provides a read clock signal directly to the first and second memory units at a rate corresponding to the average data rate of the received valid data bits during the reception of the packet being read; and a controller that is responsive to the packet counter, wherein the controller controls the switching of the first and second switches such that the first and second switches switch between adjacent packets, with the second switch switching in opposite phase to that of the first switch.

2. The data synchronizer of claim 1, wherein the memory unit and the second memory unit have a size equal to the length of a packet.

3. The data synchronizer of claim 1, wherein the first memory unit and the second memory unit comprise a first FIFO buffer and a second FIFO buffer, respectively.

4. The data synchronizer of claim 3, wherein the first FIFO buffer and the second FIFO buffer each have a length equal to the length of a packet.

5. The data synchronizer of claim 1, wherein upon the completion of counting the bits of data in a current packet being written to one of the first and second memory units, and the determination that the current packet so written is a valid packet, the packet counter provides a signal to the controller indicating that a valid packet has been written, and the controller in response thereto causes the first and second switches to switch.

6. The data synchronizer of claim 5, wherein the packet counter counts the bits of data in a current packet being written by counting in bytes.

7. A method for receiving an input stream of asynchronous digital data in packets, each packet having a length and comprising valid data bits asserted during valid periods, and for providing an output stream of synchronous data in packets, comprising the steps of:

writing the input data to a first and second memory unit, by deriving a write clock from the input data and providing the write clock to the first and second memory unit;

sensing the start of a current packet;

writing the current packet at the write clock rate to one of the first and second memory units during valid periods; and in response to sensing the start of a next packet, writing the next packet at the write clock rate to the other of the first and second memory units during valid periods;

reading data from the first and second memory unit, by generating an output frequency code word representing an average data rate of the received valid data bits during the reception of a packet that has just been stored;

selecting one of the first and second memory units having the packet that has just been stored;

responsive to the frequency code word, generating a read clock having a rate corresponding to the average data rate of the received valid data during the reception of the packet that has just been stored; and reading the packet that has just been stored at the read clock rate, wherein the read clock is directly provided to the first and second memory units.

8. The method as in claim 7 wherein the first memory unit and the second memory unit comprise a first FIFO buffer and a second FIFO buffer, respectively.

9. The method as in claim 7 wherein upon the completion of counting the bits of data in a current packet being written to one of the first and second memory units, and the determination that the current packet so written is a valid packet, the packet counter provides a signal to the control means indicating that a valid packet has been written, and the control means in response thereto causes the first and second switches to switch.

10. The method as in claim 9, wherein The packet counter counts the bits of data in a current packet being written by counting in bytes.

11. An apparatus comprising:

a data input that is configured to receive a stream of asynchronous digital data, wherein the stream includes a plurality of packets;

an input switch that is coupled to the data input;

a first FIFO memory circuit that is coupled to the input switch and that receives a write clock signal a second FIFO memory circuit that is coupled to the input switch and that receives the write clock signal;

a second switch that is coupled to the first and second FIFO memory circuits;

a packet counter that is coupled to the data input, wherein the packet counter counts a number of write cycles in a received packet from the stream and generates an output frequency code word that represents an average data rate of received valid data during reception of the received packet;

a digital frequency synthesizer that is coupled to the packet counter so as to receive the output frequency code word and that generates a read clocksignal in response to the output frequency code word, and wherein the digital frequency synthesizer that is directly coupled to the first FIFO memory circuit, the second FIFO memory circuit and the packet counter so as to directly provide the read clock signal to the first and second FIFO memory circuits; and a controller that is coupled to the first and second switches so as to control the first and second switches such that the switching of the first and second switches such that the first and second switches switch between adjacent packets, with the second switch switching in opposite phase to that of the first switch.

12. The apparatus of claim 11, wherein the digital frequency synthesizer further comprises a digital frequency and phase synthesizer that receives an input clock signal and the output frequency code word.

13. The apparatus of claim 12, wherein the input clock signal further comprises a first input clock signal, wherein the digital frequency synthesizer further comprises:
   an analog phased lock loop (PLL) that generates the first input clock signal and a second input clock signal; and
   a divider that is coupled to the analog PLL so as to receive the second input clock signal and that generates the write clocks signal.

14. An apparatus comprising:
   a data input that is configured to receive a stream of asynchronous digital data, wherein the stream includes a plurality of packets;
   an input switch that is coupled to the data input;
   a first FIFO memory circuit that is coupled to the input switch and that receives a write clock signal;
   a second FIFO memory circuit that is coupled to the input switch and that receives the write clock signal;
   a second switch that is coupled to the first and second FIFO memory circuits;
   a packet counter that is coupled to the data input, wherein the packet counter counts a number of write cycles in a received packet from the stream and generates an output frequency code word that represents an average data rate of received valid data during reception of the received packet, and wherein the packet counter includes:
   an first counter that receives a read clock signal and a reset signal;
   a second counter that receives data packets from the data input and the reset signal;
   a first flip-flop that is coupled to the first counter;
   a second flip-flop that is coupled to the second counter;
   a first comparator that is coupled to the first counter and that receives a upper limit value;
   a second comparator that is coupled to the second comparator and that receives a packet size value;
   a third comparator that is coupled to the second flip-flop and that receives the packet size value;
   a fourth comparator that is coupled to the first flip-flop and that receives a lower limit value; and
   a logic gate that is coupled to the first, second, third, and fourth comparators;
   a digital frequency synthesizer that is coupled to the packet counter so as to receive the output frequency code word, that generates the read clock signal in response to the output frequency code word, and that is coupled to the first FIFO memory circuit, the second FIFO memory circuit and the packet counter so as to provide the read clock signal; and
   a controller that is coupled to the first and second switches so as to control the first and second switches such that the switching of the first and second switches such that the first and second switches switch between adjacent packets, with the second switch switching in opposite phase to that of the first switch.

15. The apparatus of claim 14, wherein the logic gate further comprises an AND gate.

* * * * *